(12) United States Patent
Jones et al.

(10) Patent No.: US 7,080,552 B2
(45) Date of Patent: Jul. 25, 2006

(54) METHOD AND APPARATUS FOR MWD FORMATION TESTING

(75) Inventors: Dale Allen Jones, Houston, TX (US); John R. Menconi, Portland, OR (US); Andrew T. Franzen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 213 days.

(21) Appl. No.: 10/440,593

(22) Filed: May 19, 2003

(65) Prior Publication Data

US 2004/0011525 A1    Jan. 22, 2004

Related U.S. Application Data

(60) Provisional application No. 60/381,258, filed on May 17, 2002.

(51) Int. Cl.
  *E21B 49/08* (2006.01)
(52) U.S. Cl. .................................. 73/152.27
(58) Field of Classification Search .............. 73/152.02, 73/152.03, 152.08, 152.23, 152.24, 152.25, 73/152.26, 152.27, 152.28, 152.55, 152.54; 166/264
  See application file for complete search history.

(56) References Cited

U.S. PATENT DOCUMENTS

| | | |
|---|---|---|
| 1,619,328 A | 3/1927 | Benckenstein |
| 2,978,046 A | 4/1961 | True |
| 3,811,321 A | 5/1974 | Urbanosky |
| 3,813,936 A | 6/1974 | Urbanosky et al. |
| 3,858,445 A | 1/1975 | Urbanosky |
| 3,859,850 A | 1/1975 | Whitten et al. |
| 3,859,851 A | 1/1975 | Urbansoky |
| 3,864,970 A | 2/1975 | Bell |
| 3,924,463 A | 12/1975 | Urbanosky |
| 3,934,468 A | 1/1976 | Brieger |

(Continued)

FOREIGN PATENT DOCUMENTS

EP      0 697 501 A2    2/1996

(Continued)

OTHER PUBLICATIONS

M. Hooper et al.; "Applications for an LWD Formation Tester"; 1999 European Formation Damage Conference; May 28-Jun. 1, 1999; pp. 1-8; SPE 52794; Society of Petroleum Engineers, The Hague, The Netherlands.

(Continued)

*Primary Examiner*—Robert Raevis
(74) *Attorney, Agent, or Firm*—Conley Rose, P.C.

(57) ABSTRACT

A method and apparatus for formation testing is disclosed. In a preferred embodiment, a formation testing tool includes a longitudinal body with a flowbore; a plurality of extendable centralizing pistons coupled to the body; an extendable sample device coupled to the body; and a centralizing hydraulic circuit configured to cause each of the plurality of centralizing pistons to extend at substantially the same rate. The centralizing hydraulic circuit includes a series of flow control and pressure-determining valves configured to extend the centralizing pistons at substantially the same rate, and to help maintain stability in the hydraulic circuit in response to external pressures. In some embodiments, the extendable sample device is preferably configured to be recessed beneath a surface of the body in a first position and to extend beyond the surface in a second position. The extendable sample device is preferably extended to contact the borehole wall substantially normal to the wall, protecting the sample device from excessive bending moments and other excessive forces.

27 Claims, 12 Drawing Sheets

U.S. PATENT DOCUMENTS

| | | |
|---|---|---|
| 3,952,588 A | 4/1976 | Whitten |
| 3,964,305 A | 6/1976 | Wray et al. |
| 4,069,865 A | 1/1978 | Gazda et al. |
| RE29,562 E | 3/1978 | Wray et al. |
| 4,171,642 A | 10/1979 | Taylor |
| 4,210,018 A | 7/1980 | Brieger |
| 4,278,130 A | 7/1981 | Evans et al. |
| 4,287,946 A | 9/1981 | Brieger |
| 4,406,335 A | 9/1983 | Koot |
| 4,416,152 A | 11/1983 | Wilson |
| 4,434,653 A | 3/1984 | Montgomery |
| 4,507,957 A | 4/1985 | Montgomery et al. |
| 4,513,612 A | 4/1985 | Shalek |
| 4,578,675 A | 3/1986 | MacLeod |
| 4,583,592 A | 4/1986 | Gazda et al. |
| 4,593,560 A | 6/1986 | Purfurst |
| 4,615,399 A | 10/1986 | Schoeffler |
| 4,665,398 A | 5/1987 | Lynch et al. |
| 4,669,537 A | 6/1987 | Rumbaugh |
| 4,745,802 A | 5/1988 | Purfurst |
| 4,830,107 A | 5/1989 | Rumbaugh |
| 4,843,878 A | 7/1989 | Purfurst et al. |
| 4,845,982 A | 7/1989 | Gilbert |
| 4,860,580 A | 8/1989 | DuRocher |
| 4,860,581 A | 8/1989 | Zimmerman et al. |
| 4,879,900 A | 11/1989 | Gilbert |
| 4,884,439 A | 12/1989 | Baird |
| 4,890,487 A | 1/1990 | Dussan V. et al. |
| 4,898,236 A | 2/1990 | Sask |
| 4,936,139 A | 6/1990 | Zimmerman et al. |
| 4,941,350 A | 7/1990 | Schneider |
| 4,951,749 A | 8/1990 | Carroll |
| 5,056,595 A | 10/1991 | Desbrandes |
| 5,095,745 A | 3/1992 | Desbrandes |
| 5,101,907 A | 4/1992 | Schultz et al. |
| 5,230,244 A | 7/1993 | Gilbert |
| 5,231,874 A | 8/1993 | Gilbert |
| 5,233,866 A | 8/1993 | Desbrandes |
| 5,238,070 A | 8/1993 | Schultz et al. |
| 5,265,015 A | 11/1993 | Auzerais et al. |
| 5,269,180 A | 12/1993 | Dave et al. |
| 5,279,153 A | 1/1994 | Dussan V. et al. |
| 5,303,775 A | 4/1994 | Michaels et al. |
| 5,329,811 A | 7/1994 | Schultz et al. |
| 5,335,542 A | 8/1994 | Ramakrishnan et al. |
| 5,377,755 A | 1/1995 | Michaels et al. |
| 5,443,129 A | 8/1995 | Bailey et al. |
| 5,473,939 A | 12/1995 | Leder et al. |
| 5,540,280 A | 7/1996 | Schultz et al. |
| 5,549,159 A | 8/1996 | Shwe et al. |
| 5,587,525 A | 12/1996 | Shwe et al. |
| 5,602,334 A | 2/1997 | Proett et al. |
| 5,622,223 A | 4/1997 | Vasquez |
| 5,635,631 A | 6/1997 | Yesudas et al. |
| 5,644,076 A | 7/1997 | Proett et al. |
| 5,655,609 A * | 8/1997 | Brown et al. .................. 175/76 |
| 5,743,334 A | 4/1998 | Nelson |
| 5,799,733 A | 9/1998 | Ringgenberg et al. |
| 5,803,186 A | 9/1998 | Berger et al. |
| 5,901,796 A | 5/1999 | McDonald |
| 5,911,285 A | 6/1999 | Stewart et al. |
| 5,979,572 A | 11/1999 | Boyd et al. |
| 6,006,834 A | 12/1999 | Skinner |
| 6,026,915 A | 2/2000 | Smith et al. |
| 6,047,239 A | 4/2000 | Berger et al. |
| 6,058,773 A | 5/2000 | Zimmerman et al. |
| 6,142,245 A * | 11/2000 | Best ........................... 175/57 |
| 6,157,893 A | 12/2000 | Berger et al. |
| 6,164,126 A | 12/2000 | Ciglenec et al. |
| 6,189,612 B1 | 2/2001 | Ward |
| 6,230,811 B1 | 5/2001 | Ringgenberg et al. |
| 6,279,654 B1 | 8/2001 | Mosing et al. |
| 6,301,959 B1 | 10/2001 | Hrametz et al. |
| 6,581,455 B1 | 6/2003 | Berger et al. |

FOREIGN PATENT DOCUMENTS

| | | |
|---|---|---|
| EP | 0 978 630 A2 | 2/2000 |
| EP | 1 316 674 A1 | 6/2003 |
| GB | 2 304 906 A | 3/1997 |
| WO | WO 01/33044 A1 | 5/2001 |
| WO | WO 01/33045 A1 | 5/2001 |

OTHER PUBLICATIONS

European Patent Office, Supplementary European Patent Search Report, Jan. 12, 2006.

* cited by examiner

METHOD AND APPARATUS FOR MWD FORMATION TESTING

CROSS-REFERENCE TO RELATED APPLICATIONS

The present application claims the benefit of U.S. Provisional Application Ser. No. 60/381,258, filed May 17, 2002, entitled Method and Apparatus for MWD Formation Testing, which is hereby incorporated herein by reference.

STATEMENT REGARDING FEDERALLY SPONSORED RESEARCH OR DEVELOPMENT

Not applicable.

BACKGROUND OF THE INVENTION

1. Field of the Invention

This invention relates generally to a method and apparatus utilized in hydrocarbon exploration. More specifically, the invention relates to formation testing tools. Even more particularly, the present invention is directed to methods and apparatus for performing formation testing while drilling.

2. Background and Related Art

Geologists and geophysicists are interested in the characteristics of the formations encountered by a drill bit as it is drilling a well for the ultimate production of hydrocarbons from the earth. Such information is useful in determining the correctness of the geophysical data used to choose the drilling location and in choosing subsequent drilling locations. In horizontal drilling, such information can be useful in determining the location of the drill bit and the direction that drilling should follow.

Such information can be derived in a number of ways. For example, cuttings from the mud returned from the drill bit location can be analyzed, or a core can be bored along the entire length of the borehole. Alternatively, the drill bit can be withdrawn from the borehole and a "wireline logging tool" can be lowered into the borehole to collect data or otherwise determine formation characteristics. In still another approach, called "measurement while drilling" ("MWD") or "logging while drilling" ("LWD"), tools are included in the drill string that collect formation data while the drill bit remains in the borehole.

One type of formation testing tool measures formation pressure, which can be used for a variety of purposes, including computing the permeability and porosity of the formation. A conventional such formation testing tool operates in the wireline environment. It is lowered into the well to a depth where formation testing is desired. Before the wire line tool can be lowered, however, the entire drill string must be removed from the borehole. This process, known as "tripping" is a laborious and time consuming process by which the drill string, which may be miles long, is removed from the hole, pipe section by pipe section. After the formation tester has been lowered to the appropriate depth by means of a wireline, the borehole interval adjacent to the tester must be packed off and isolated from the drilling fluid that remains in and fills the borehole so that accurate reading of the formation pressure can be obtained. With the pressure recorded, the tool is retrieved to the surface for analysis and the drill string is then reassembled and replaced in the borehole, section by section. As well be understood, conducting formation tests via a wireline tool is time consuming and costly, given that costs of drilling a well may be thousands of dollars per hour.

As mentioned above, testing the formation using a tester incorporated into the drill string is desirable in that the drill string does not need to be removed to conduct the test. However, there are various complications associated with conventional such apparatus. For example, in certain such testers, the flow of drilling fluid must be stopped in order to measure the formation pressure or take a sample of the formation fluid. When this occurs, without the flow of constantly moving drilling fluid, the bottom hole assembly can become stuck in the hole, necessitating a costly and time consuming procedure to free the stock tool. Furthermore, mud turbine generators are sometimes employed in the bottom hole assembly as the means of supplying electrical power needed to actuate the formation tester. In such tools, stopping the flow of drilling fluid therefore prevents the tool from generating the needed electrical power, and power to operate the formation tester must be supplied by other means, such as batteries which, in certain instances, may be less reliable or otherwise less desirable. Other problems and shortcomings are associated with present day formation testers.

For example, certain conventional formation testers employ a extendible probe that extends from the tool to engage the borehole wall in order to conduct the fluid test or sampling. In certain instances, however, particularly when drilling a horizontal well, the orientation of the tool may be such that the probe extends out of the tool on the low side of the hole. When this occurs, the extending probe may be subjected to detrimental loading as the piston extends and contacts the borehole. Further, there are many instances during which the extending probe will engage the borehole wall at an angle, rather than being normal to the wall. When this occurs, the seal necessary for properly extracting and measuring formation fluid pressure is difficult, if not impossible, to achieve.

Accordingly, there remains a need in the art for a formation testing apparatus that may be employed in a drill string to conduct reliable formation testing. Ideally, such apparatus would not require that the flow of drilling fluid be cut off so as to prevent the bottom hole assembly from sticking to the borehole and permit the formation tester to be powered by the flow of drilling fluid. Further, it would be preferable if the sensed data and other measurements could be communicated to the surface via mud pulse telemetry, which relies on the flow of drilling fluid. A formation tester that insures that an extending probe contacts the borehole wall substantially normal to the wall, rather than at an angle, and which protects the probe from excessive bending moments and other excessive forces would be particularly welcomed by the industry.

BRIEF SUMMARY OF SOME OF THE PREFERRED EMBODIMENTS OF THE INVENTION

In accordance with the spirit of the present invention, a novel formation testing tool is described herein. One property of the present formation testing tool is that an extending probe or sample device contacts the borehole wall substantially normal to the wall, protecting the probe from excessive bending moments and other excessive forces.

Several embodiments are disclosed as being illustrative of the spirit of the invention. For example, in one embodiment, the formation testing tool includes a longitudinal body with a flowbore; a plurality of extendable centralizing pistons coupled to the body; an extendable sample device coupled to the body; and a centralizing hydraulic circuit configured to cause each of the plurality of centralizing pistons to extend at substantially the same rate. The centralizing pistons are extended at substantially the same rate to assist in positioning the extending sample probe such that it is substantially normal to the borehole wall. The centralizing hydraulic circuit includes a series of flow control and pressure-determining valves configured to extend the centralizing pistons at substantially the same rate, and to help maintain stability in the hydraulic circuit in response to external pressures. The circuit also includes a controller for operating and managing the valves and pistons. The extendable sample device is preferably configured to be recessed beneath the surface of the body in a first position and to extend beyond the surface in a second position.

Methods of use for the formation testing tool are also described herein. For example, a method for formation testing comprising includes extending at substantially the same rate a plurality of centering pistons from a formation testing tool; centering the formation testing tool in a borehole; and testing the formation. These and other embodiments of the present invention, as well as their features and advantages, will become apparent with reference to the following detailed description.

BRIEF DESCRIPTION OF THE DRAWINGS

For a detailed description of the preferred embodiments of the invention, reference will now be made to the accompanying drawings in which.

NOTATION AND NOMENCLATURE

In the following discussion and in the claims, the terms "including" and "comprising" are used in an open-ended fashion, and thus are to be interpreted to mean "including, but not limited to . . . ". Reference to up or down will be made for purposes of description with "up," "upward," or "upper" meaning toward the surface of a well and "down," "downward," or "lower" meaning toward the bottom of a well. In addition, the term "couple," "couples," or "coupled" is intended to mean either an indirect or a direct connection. Thus, if a first device couples to a second device, that connection may be through a direct connection, or through an indirect electrical or fluid connection via other devices and connections.

This exemplary disclosure is provided with the understanding that it is to be considered an exemplification of the principles of the invention, and is not intended to limit the invention to that illustrated and described herein. In particular, various embodiments of the present invention provide a number of different constructions and methods of operation. It is to be fully recognized that the different teachings of the embodiments discussed below may be employed separately or in any suitable combination to produce desired results.

DETAILED DESCRIPTION OF THE PREFERRED EMBODIMENTS

Figure 1:
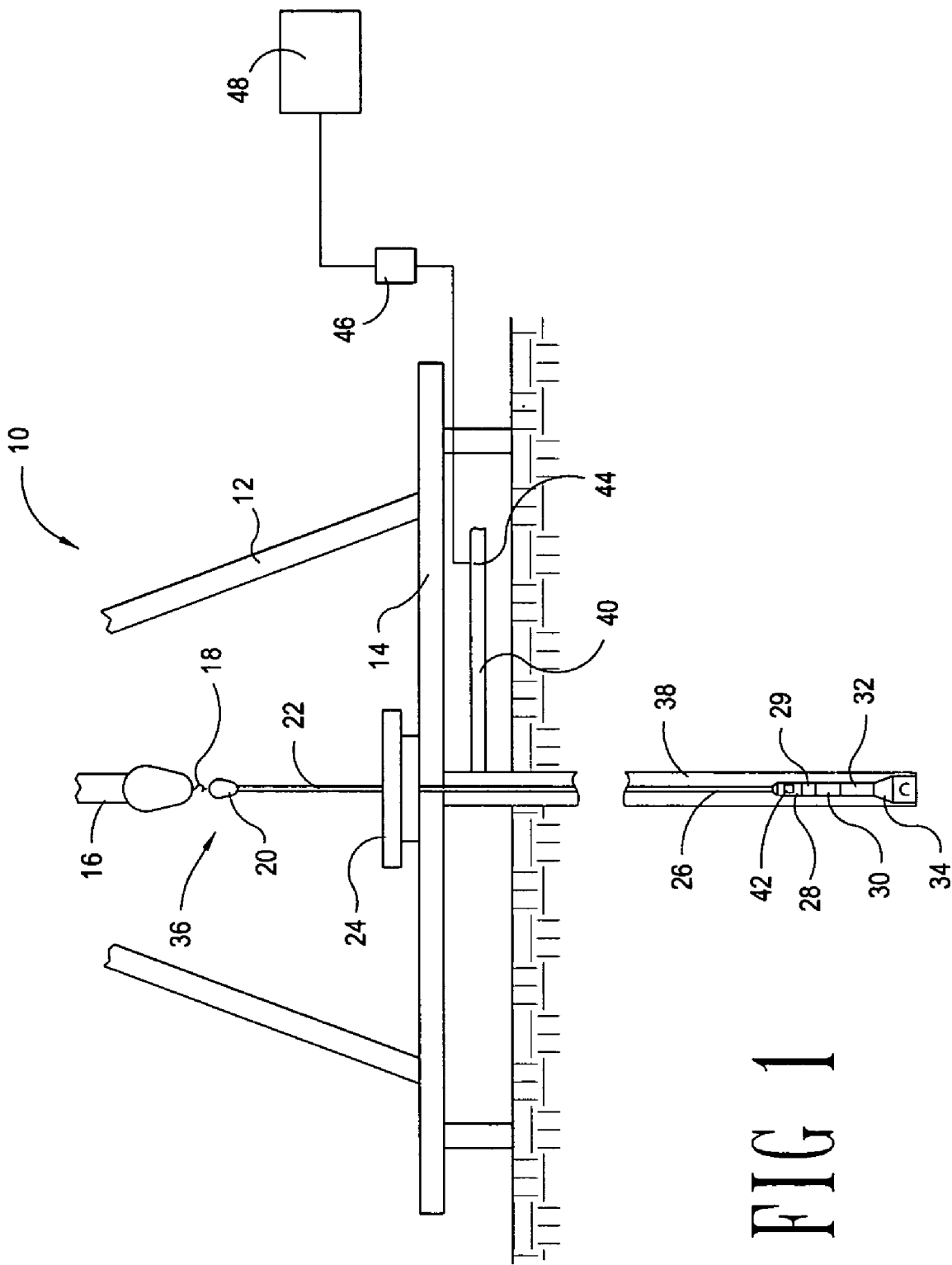
FIG. 1 is a schematic view, partially in cross-section showing a well being drilled including a bottom hole assembly that includes a formation testing tool of the preferred embodiment.

Referring to FIG. 1, a drilling rig 10 (simplified to exclude items not important to this application) comprises a derrick 12, derrick floor 14, draw works 16, hook 18, swivel 20, kelly joint 22 and rotary table 24, such components being arranged in a conventional manner so as to support and impart rotation to drillstring 26. Drill string 26 includes at its lower end a bottom hole assembly 29 which comprises drill collar 28, MWD tool 30 (which may be any kind of MWD tool, such as an acoustic logging tool), MWD formation testing tool 32 (which may be a separate tool as shown or may be incorporated into another tool) and drill bit 34. A description of exemplary MWD tools and MWD formation testing tools may be found in the provisional Patent Application No. 60/381,243 filed May 17, 2002, entitled Formation Tester, and in the patent application filed concurrently herewith via Express Mail No. EV324573681US and entitled MWD Formation Tester, which claims priority to the previously referenced provisional application, both applications hereby incorporated by reference herein for all purposes. Drilling fluid (which may also be referred to as "drilling mud") is injected into the swivel by a mud supply line 36. The mud travels through the kelly joint 22, drillstring 26, drill collars 28, MWD tool 30 and MWD formation testing tool 32 and exits through ports in the drill bit 34. The mud then flows up the borehole 38. A mud return line 40 returns mud from the borehole 38 and circulates it to a mud pit (not shown) and ultimately back to the mud supply line 36.

The data collected by the MWD tool 30 and formation testing tool 32 is returned to the surface for analysis by telemetry transmitted in any conventional manner, including but not limited to mud pulse telemetry, or EM or acoustic telemetry. For purposes of the present application, the embodiment described herein will be explained with respect to use of mud pulse telemetry. A telemetry transmitter 42 located in a drill collar 28 or in one of the MWD tools collects data from the MWD tools and transmits it through the mud via pressure pulses generated in the drilling mud. A telemetry sensor 44 on the surface detects the telemetry and returns it to a demodulator 46. The demodulator 46 demodulates the data and provides it to computing equipment 48 where the data is analyzed to extract useful geological information.

Further, commands may be passed downhole to the MWD tool and formation testing tool 32 in a variety of ways. In addition to the methods described in the previous paragraph, information may be transmitted by performing predefined sequences of drill pipe rotations that can be sensed in the MWD tools and translated into commands. Similarly, the mud pumps may be cycled on and off in predefined sequences to transmit information in a similar fashion.

Figure 2:
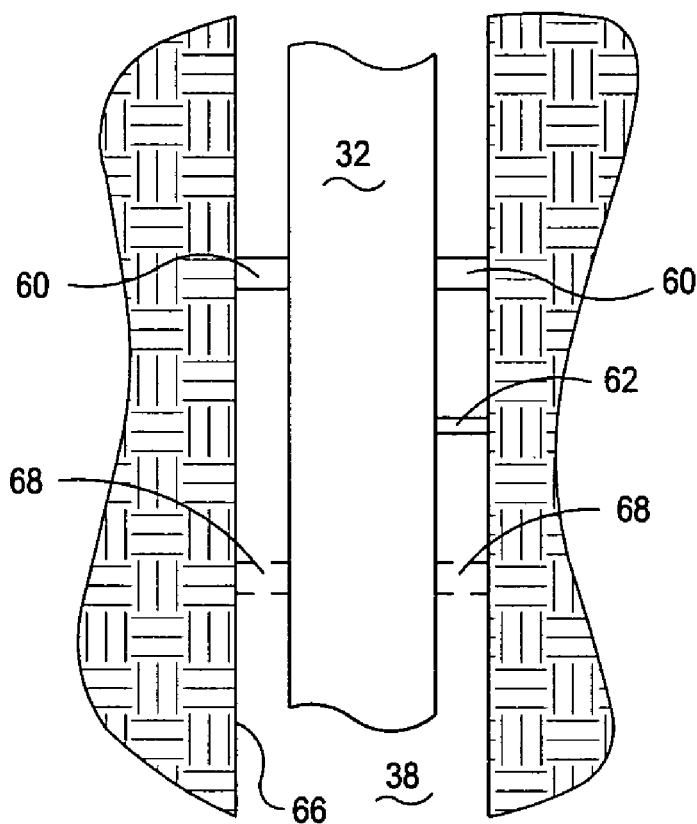
FIG. 2 is an elevation view, partially in cross-section of the formation testing tool of FIG. 1.

The formation testing tool 32 includes a plurality of centralizing pistons 60 and one or more sampling pistons 62, as shown in FIG. 2. For present purposes, the formation testing tool will be described with reference to tool 32 having one sampling piston 62, it being understood that the tool could likewise be configured to include additional such pistons 62. The plurality of centralizing pistons 60 centralize the formation testing tool 32 in the borehole 38. Once the formation testing tool 32 is centralized, the sampling piston 62 extends from the formation testing tool 32 to the borehole wall 66, where it seals against the wall and allows formation testing to be performed.

In one embodiment of the formation testing tool 32, the centralizing pistons 60 are all in the same cross section and the sampling piston 62 is in a different cross section. In another embodiment, one or more of the centralizing pistons 68 are in a different cross-section from the remaining centralizing pistons 60. In still another embodiment, the centralizing pistons are in three or more cross sections.

Figure 3:
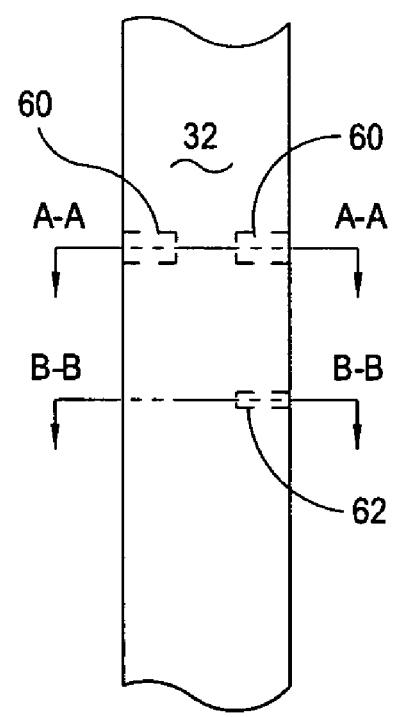
FIG. 3 is an elevation view of the formation testing tool of FIG. 2.

During drilling operations, the centralizing pistons 60 and the sampling piston 62 are retained in a retracted position inside the formation testing tool 32, as shown in FIG. 3. In this position, the sampling piston 62 is recessed below the surface of the formation testing tool 32, as is discussed further below. When it is time to perform the formation testing function, the rotation of the drill string 26 is ceased and the centralizing pistons 60 are extended at the same rate so that the formation testing tool 32 is relatively centralized within the borehole, as shown in FIG. 2. The sampling piston 62 is then extended and the formation testing tool 32 performs its testing function.

The formation testing tool 32 is centralized before the sampling piston 62 is extended for several reasons. Centering the formation testing tool 32 in the borehole improves the likelihood that the sampling piston 62 will only have to be partially extended to reach the borehole wall 66. The sampling piston 62 is less vulnerable to bending when it is partially extended than when it is fully extended. This is especially important in MWD applications in which torque or axial loads may be inadvertently applied to tool 32. Further, centering the formation testing tool 32 increases the likelihood that the sampling piston will be normal to the borehole wall rather than at an angle, which improves the conditions for sealing the piston against the borehole wall. Still further, centralizing the tool 32 in the borehole maximizes the size of the borehole that can be sampled with a given centralizing piston length. The short distance that the centralizing pistons 60 need to be extended allows more room in the drill collar for fluid flow through the flowbore of the tool. Preferably, the tool 32 will operate while drilling fluids remain circulating in borehole 38 which will minimize the possibility of the tool assembly sticking, allow data to be transmitted to the surface for real-time examination and decision making, and allow the centralizing and sampling pistons to be powered by a mud turbine generator which require the continuous flow of drilling fluid to operate.

Figure 4:
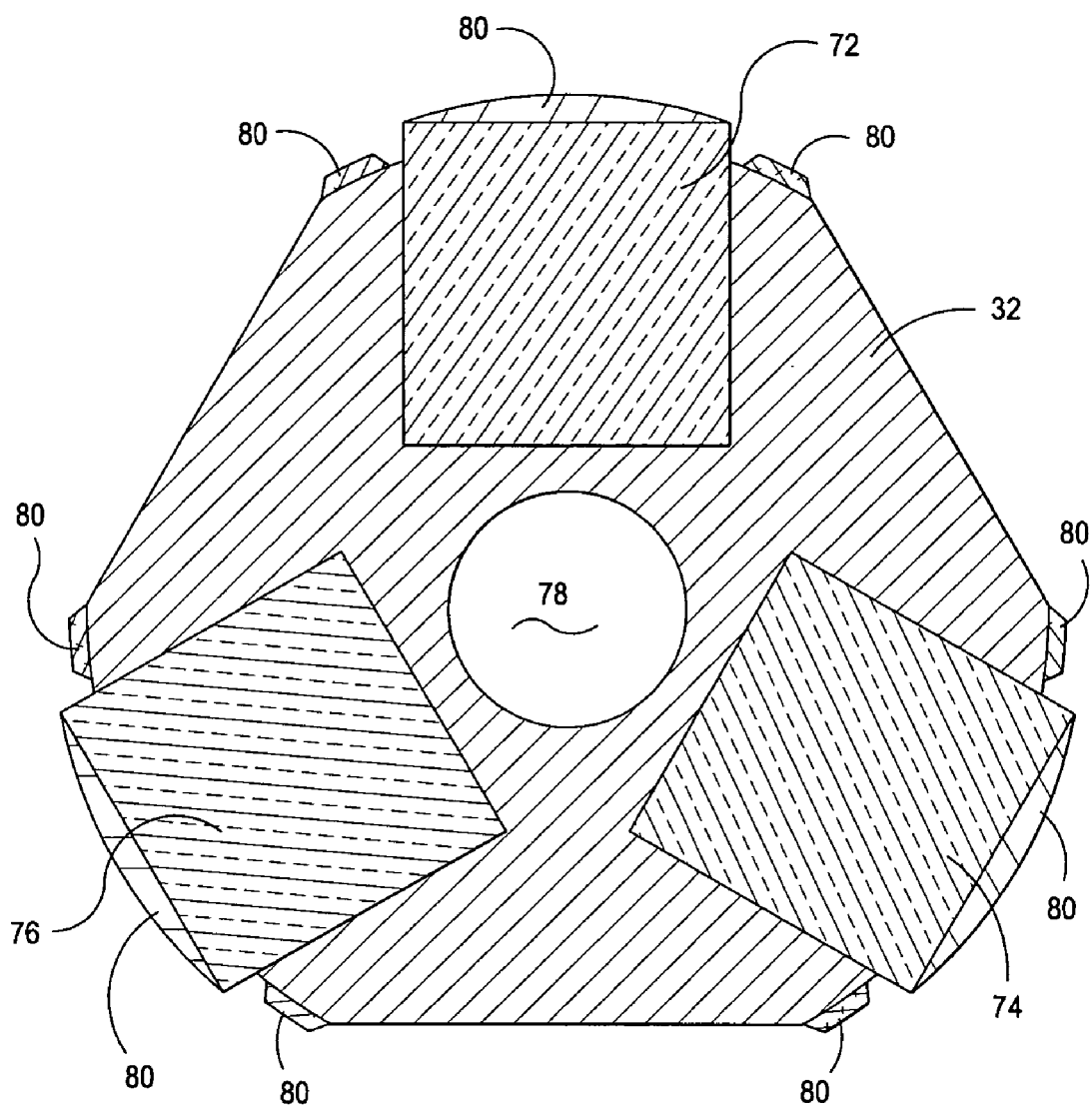
FIGS. 4, 5, 6, 7 and 8 are cross sectional views along lines A—A shown in FIG. 3 of the formation testing tool of FIG. 3.

The formation testing tool's 32 centering apparatus is illustrated in FIG. 4. In the embodiment illustrated in FIG. 4, the formation testing tool 32 includes three centralizing pistons 72, 74 and 76. It will be understood that tool 32 can include any number of centralizing pistons that accomplish the functions described below. A flowbore 78 through the center of the formation testing tool 32 allows drilling mud to flow through the tool to the drill bit 34 at the end of the drill string 26 (FIG. 1). Flowbore 78 is preferably centralized in formation testing tool 32 but may be offset from the axis of the tool 32. Hardfacing 80 is coupled to portions of the tool 32 to prevent damage to the tool during drilling operations.

Figure 5:
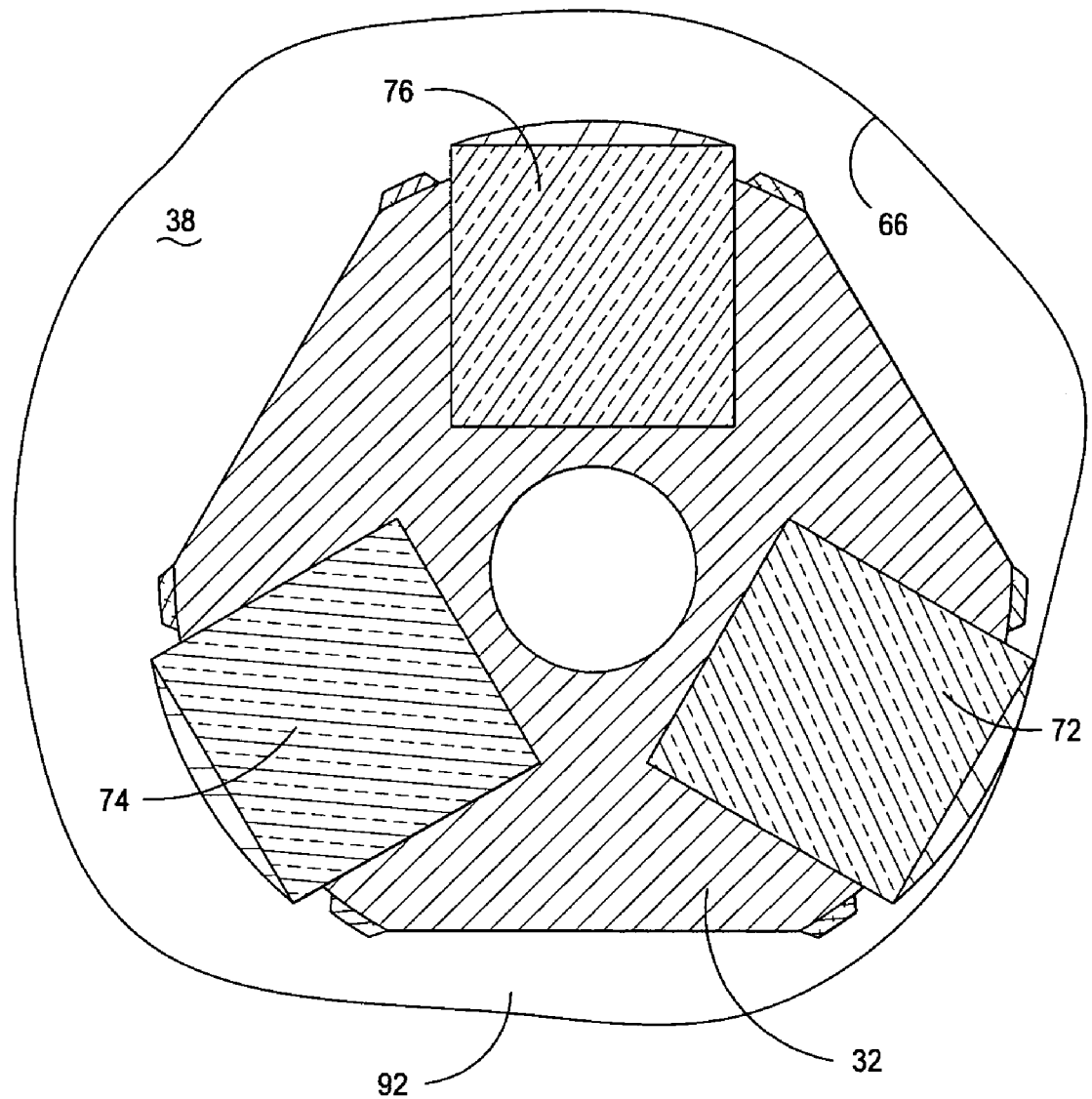

FIG. 5 shows the formation testing tool 32 in the borehole 38 after the drill string has stopped rotating. An annulus 92 is formed between tool 32 and the borehole wall 66. As can be seen in FIG. 5, the formation testing tool 32 has stopped in a position in which it is not aligned with the center of the borehole. Centralizing piston 72 is close to the borehole wall 66, while the other pistons 74 and 76 are some distance away from the wall.

Figure 6:
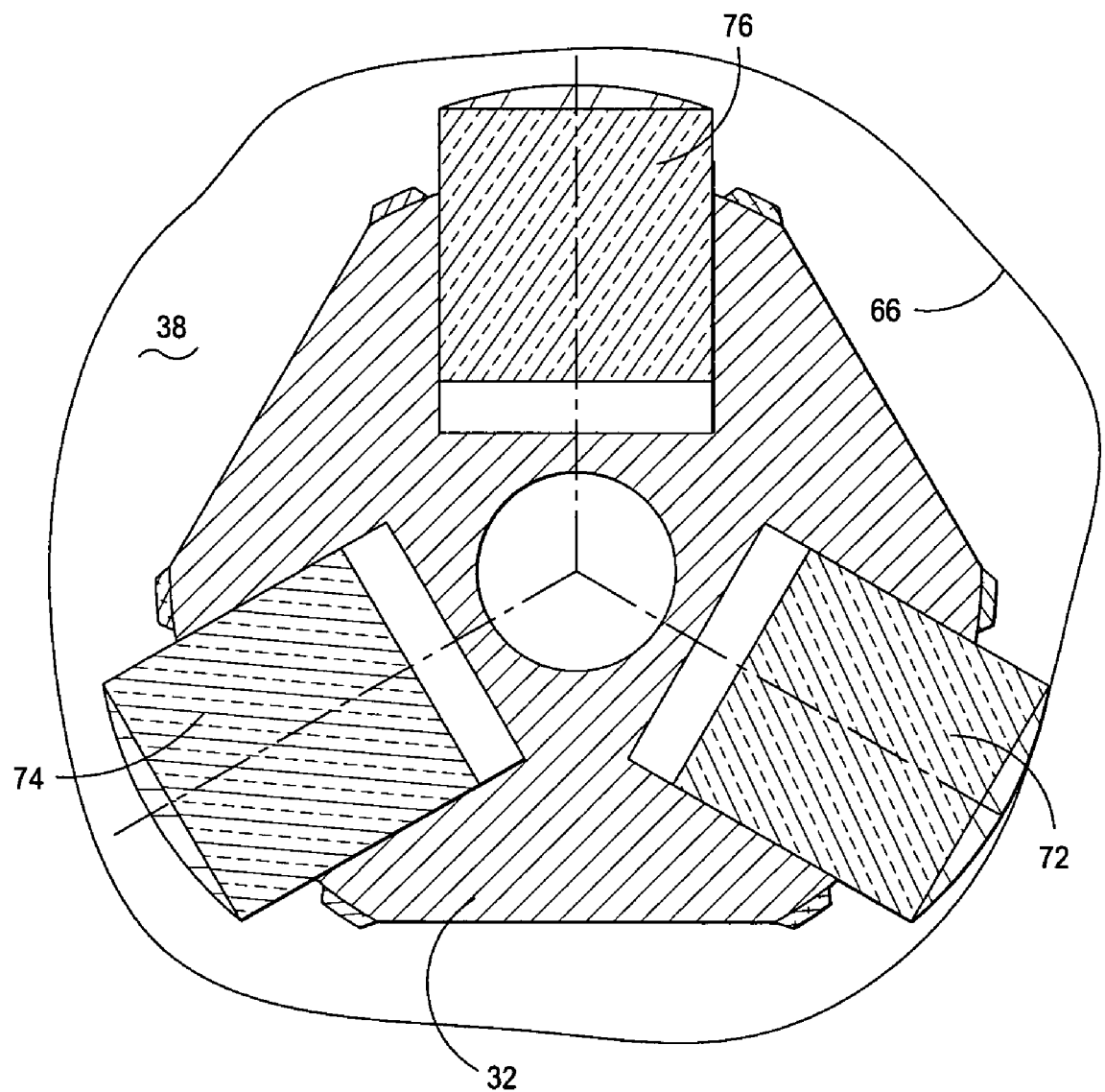

The centralizing process begins as shown in FIG. 6. The three centralizing pistons 72, 74 and 76 begin to extend from the formation testing tool 32. The centralizing pistons 72, 74 and 76 extend at the same rate. The rate of extension may vary from moment to moment but the rate of extension for one piston at a given moment in time is substantially, i.e., within that allowed by tolerances, the same as the rate of extension of the other two pistons. Consequently, the three pistons 72, 74 and 76 will extend the same amount from the formation testing tool 32 at any given moment in time. Given its position relative to borehole wall 66, piston 72 pushes the formation testing tool 32 away from the borehole wall 66. The other pistons 74 and 76 have not yet contacted the borehole wall and, therefore, have no effect.

Figure 7:
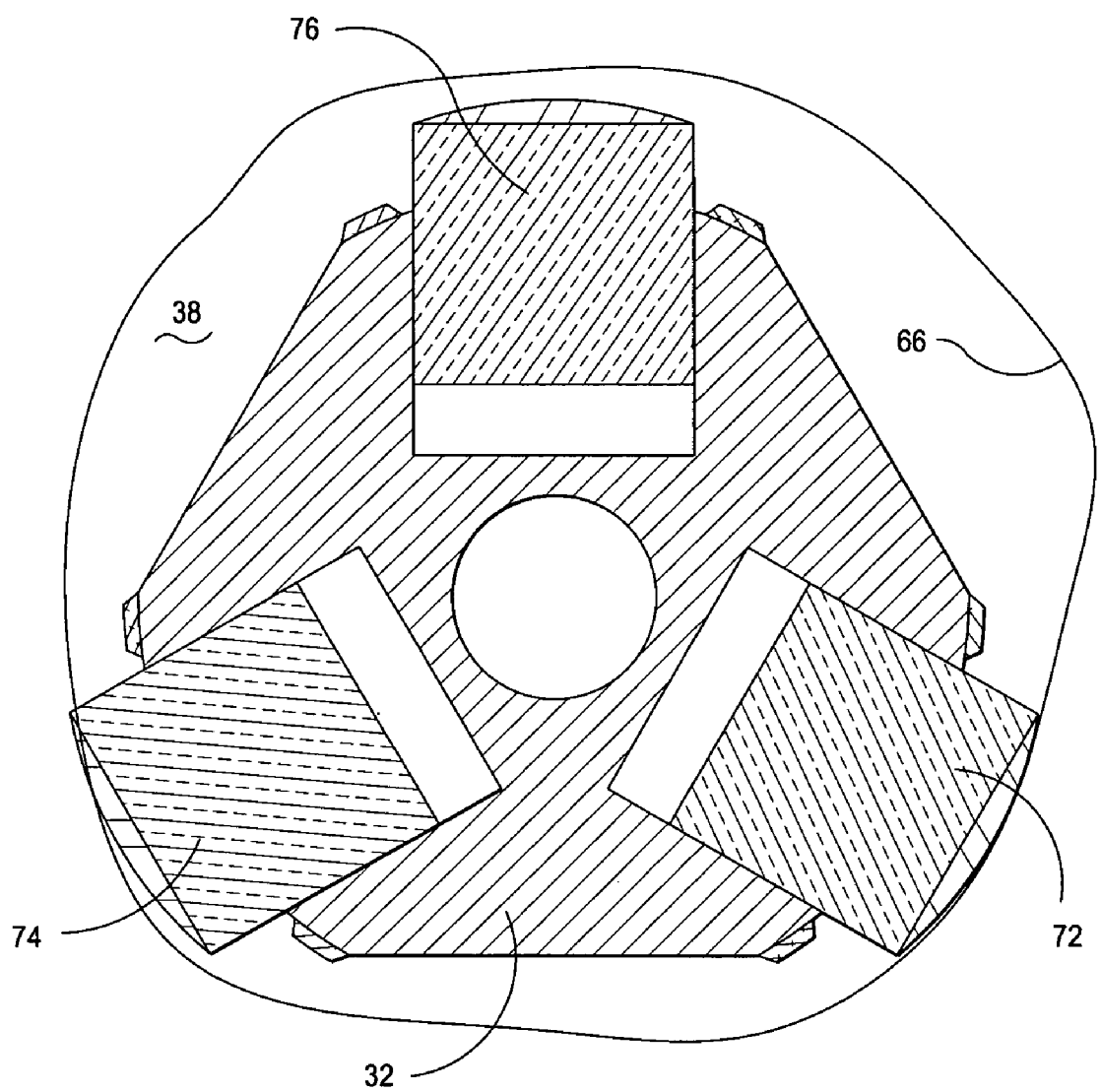

The centralizing process continues, as shown in FIG. 7, with the centralizing pistons 72, 74 and 76 continuing to extend, all at the same rate. As shown in FIG. 7, piston 72 has pushed the formation testing tool 32 far enough that piston 74 has come into contact with the borehole wall. Piston 76 has not yet contacted the borehole wall.

Figure 8:
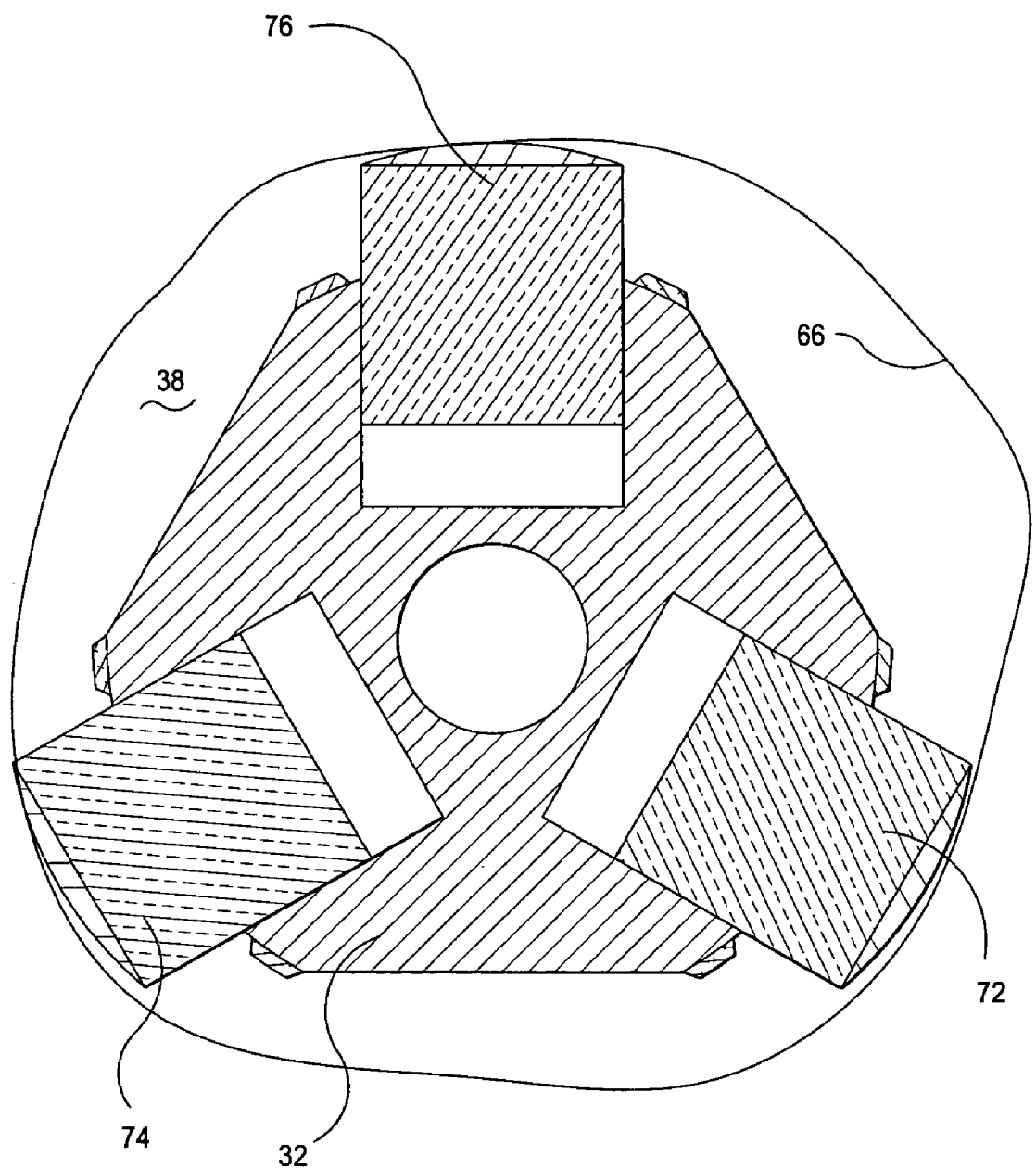

The final position is illustrated in FIG. 8. All of the centralizing pistons 72, 74 and 76 are in contact with the borehole wall and, because they extended at the same rate, they extend the same distance from the formation testing tool 32. Consequently, the formation testing tool 32 is centered in the borehole.

Figure 9A:
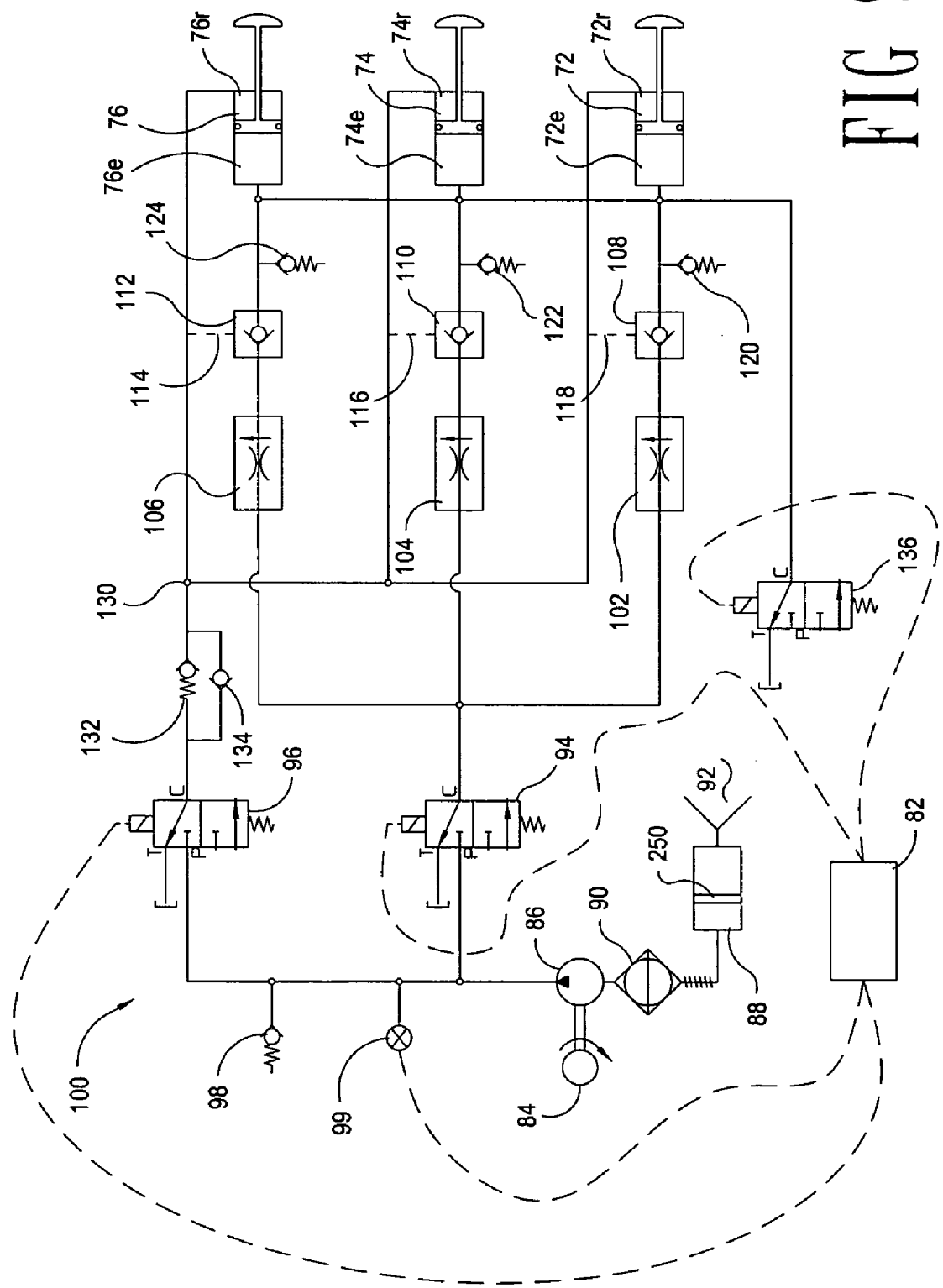
FIG. 9A is a schematic of a hydraulic circuit of the centralizer pistons of the formation testing tool of FIG. 3.

The hydraulic circuit that accomplishes the centering function is schematically illustrated in FIG. 9A. A controller 82 is connected to all of the controllable elements in the hydraulic circuit illustrated in FIG. 9A and in hydraulic circuits described below. The connections to the controllable elements are conventional and are not illustrated. Controller 82 is located in MWD tool 30, or in formation testing tool 32, or elsewhere in bottom hole assembly 29 (FIG. 1). The sequence of operations coordinated by the controller 82 is illustrated in FIG. 9B.

Figure 9B:
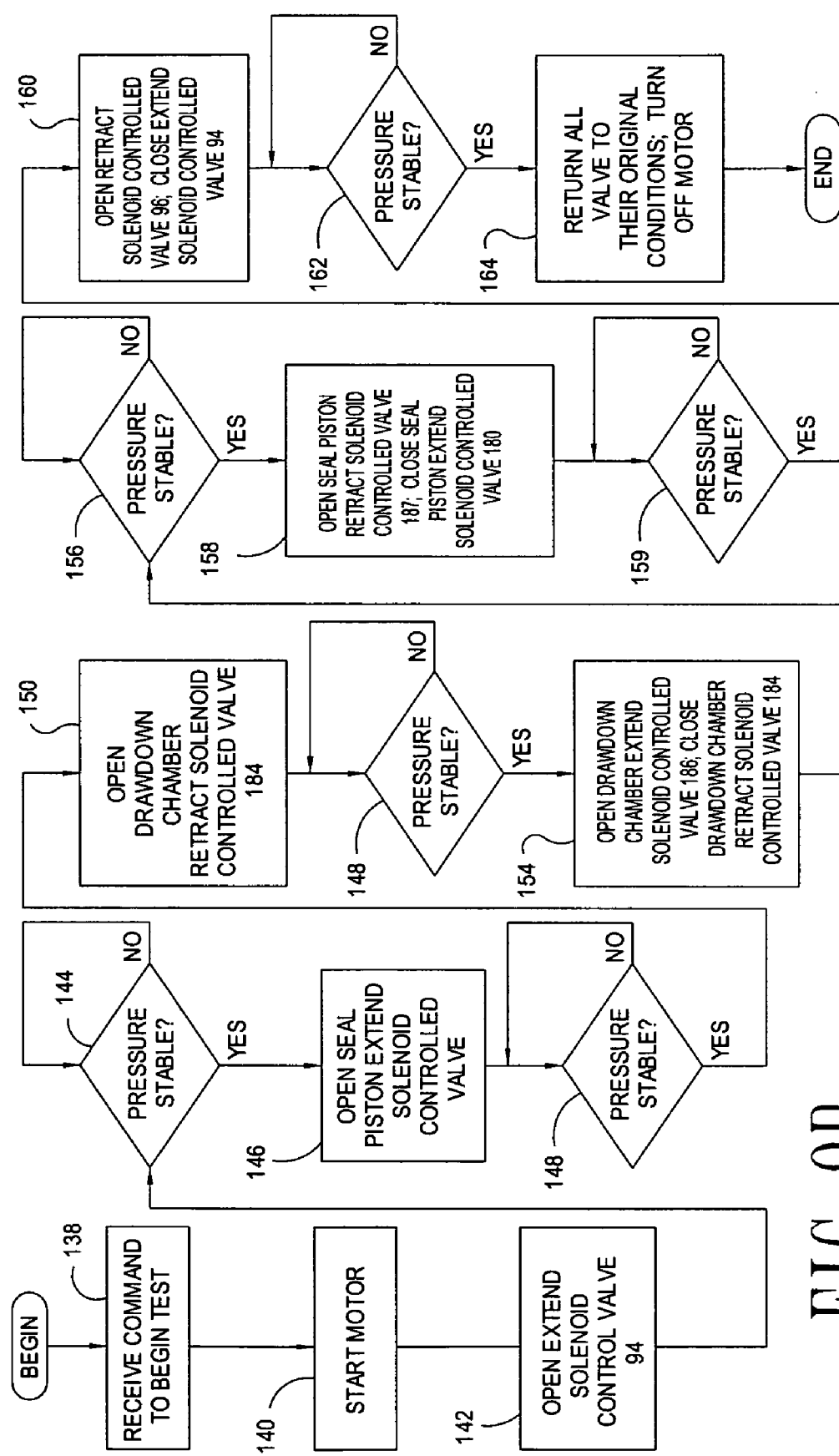
FIG. 9B is a flow chart showing the preferred sequence of operation of the formation testing tool of FIG. 3.

The controller 82 detects control signals, transmitted from the surface in one of the formats described above, ordering the formation testing tool 32 to conduct a formation test (block 138 in FIG. 9B). When it receives the command, the centralizing pistons 60 and the sampling piston 62 are in their withdrawn positions, as shown in FIG. 3. The drill-string has stopped rotating.

The controller 82 orders the motor 84 to begin to rotate (block 140 in FIG. 9B). The motor 84 can be an electric motor or a mud turbine or any other source of energy. The motor 84 is coupled to a pump 86 and causes pump 86 to draw hydraulic fluid out of a hydraulic reservoir 88 through a serviceable filter 90. The pressure of hydraulic reservoir 88 is approximately equal to the pressure in the annulus 92 between the tool 32 and the wall of the borehole through the use of a pressure balance piston 250 (shown in FIGS. 9A and 12).

The pump 86 directs the hydraulic fluid into hydraulic circuit 100 that includes extend solenoid actuated valve 94, retract solenoid actuated valve 96, relief valve 98 and differential pressure transducer 99. The relief valve 98 prevents damage to the hydraulic circuit 100 and provides other functions as described below. The electrical output of pressure transducer 99 is coupled to the controller 82 and allows the controller 82 to monitor pressure in hydraulic circuit 100 and control the progress of the formation testing operation, as described below.

The controller 82 actuates (or "opens") the extend solenoid actuated valve 94 (block 142 in FIG. 9B). Prior to being actuated, in its "normal" position, valve 94 has its control port (C) connected to its tank port (T), the position shown in FIG. 9A. Upon actuation by controller 82, its control port (C) connects to its pump port (P). In this position, hydraulic fluid flows from the pump 86 to three pressure compensated flow control valves (FCVs) 102, 104 and 106. Each FCV has the characteristic that, when the pressure on its output side is between a minimum value and a maximum value (e.g., between 200 and 3000 p.s.i.), fluid flows from its output side at a constant rate. Thus, for the range of operation between 200 and 3000 p.s.i., then the flow rate from the FCVs will be the same when the pressure on their output sides is, for example, 250 p.s.i. as it will when the pressure is, for example, 2550 p.s.i.

The hydraulic fluid flows through the FCVs 102, 104 and 106 to pilot control valves (PCVs) 108, 110 and 112, respectively. The PCVs 108, 110 and 112 act as check valves to prevent the reverse flow of hydraulic fluid until the pressure applied to their pilot ports (shown on FIG. 9A as dotted lines 114, 116 and 118) exceeds a predetermined amount, at which time they allow fluid flow in either direction.

The hydraulic fluid flows through the PCVs 108, 110 and 112 to relief valves 120, 122 and 124 and to the extend sides of centralizer pistons 72, 74 and 76, respectively. Centralizer pistons 72, 74 and 76 are identified to pistons 60 previously described. The relief valves open at a predetermined pressure (for example 5000 p.s.i., as shown in FIG. 9A), providing a safety function. The centralizer pistons 72, 74 and 76 attempt to move under the pressure exerted by the hydraulic fluid on their extend sides shown as 72e, 74e, 76e, respectively.

The retract side of the centralizer pistons 72, 74 and 76 (72r, 74r and 76r) are connected together, as shown at point 130 in FIG. 9A, and are connected through a parallel-connected relief valve 132 and check valve 134 to the retract solenoid actuated valve 96, which has been left in its normally-closed position with the common (C) connected to the tank (T). The check valve 134 prevents the hydraulic fluid from flowing from the retract sides of the centralizer pistons 72, 74 and 76 through its branch of the parallel hydraulic circuit. The relief valve 132 is sized to prevent hydraulic fluid from flowing from the retract side of the centralizer pistons 72, 74 and 76 until the pressure impinging on the relief valve 132 is within the operating range of the FCVs 102, 104 and 106. For the example shown in FIG. 9A, the relief valve 132 is sized to open at 200 p.s.i., which is within the operating zone of the FCVs 102, 104 and 106.

Since the relief valve 132 opens at a pressure within the operating range of the FCVs 102, 104 and 106, fluid from each of the FCVs will flow at the same rate to the extend side of the centralizer pistons 72, 74 and 76, respectively. Consequently, the three centralizer pistons will begin to extend at the same rate. Even when one or two of the pistons encounter resistance, such as when one or two of the pistons press against the borehole wall as shown in FIGS. 6 and 7, all three pistons will continue to extend at the same rate.

When all three centralizer pistons 72, 74 and 76 meet resistance, or when all three are fully extended, the pressure in the hydraulic circuit 100 will begin to climb. When it reaches a predetermined value, for example, 3000 p.s.i. as shown in FIG. 9A, relief valve 98 will open and the pressure in the hydraulic circuit 100 will stabilize.

The controller 82, which has been monitoring the pressure in the hydraulic circuit through transducer 99 (block 144 in FIG. 9B), detects the pressure stabilization caused by the opening of the relief valve 98. The extend solenoid actuated valve 94 remains energized so that if the tool 32 shifts, hydraulic pressure will be available to adjust the positions of the centralizer pistons 72, 74 and 76 to account for the shift and to "recentralize" the tool.

Figure 10:
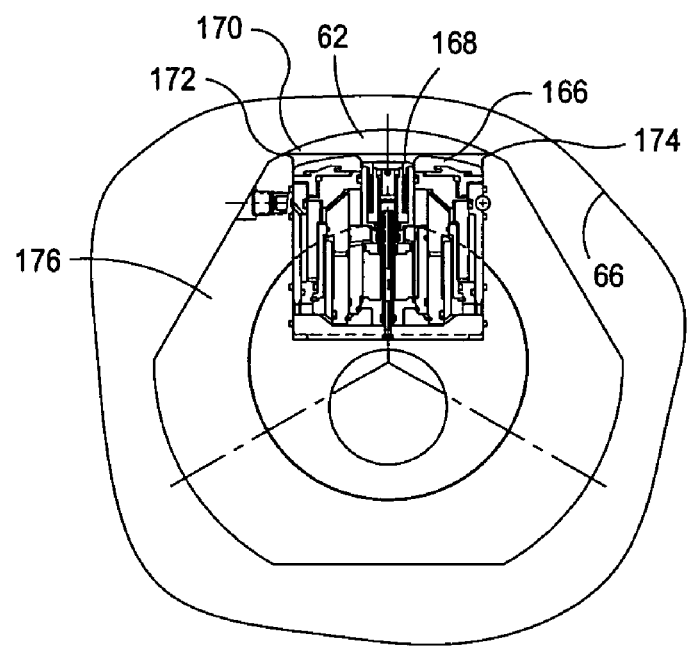
FIGS. 10 and 11 are cross sectional views along lines B—B shown in FIG. 3 of the formation testing tool of FIG. 3.

Now that the centralizer pistons 72, 74 and 76 are extended, the formation testing tool 32 is ready to begin its sampling operations. The sampling piston 62, illustrated in FIG. 10, includes a seal piston 166 and a draw down chamber 168 inside and axially aligned with the seal piston 166. When the seal piston 166 and draw down chamber 168 are retracted into the tool 32, as shown in FIG. 10, they are recessed below the surface of the tool 32. In particular, the top of the seal piston 166 is beneath a straight line 170 connecting the low points 172 and 174 in the opening in the collar 176 provided for the sampling piston.

Figure 11:
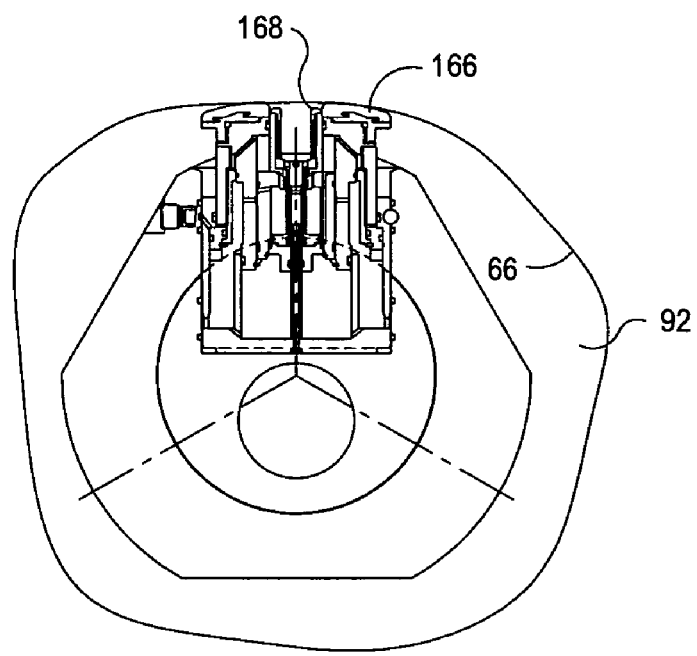

To perform the formation testing operation, the seal piston 166 is first extended to seal against the borehole wall 66, as shown in FIG. 11. The centralizer pistons 72, 74 and 76 keep the formation testing tool 32 stable during this step which reduces the possibility of damage to the seal piston 166 as it is being extended. The draw down chamber 168 extends slightly into the mudcake formed on the borehole wall 66, thereby improving the seal between the tool and the wall of the 66 borehole 38. The purpose of the seal piston 166 is to seal against the borehole wall 66 so that the draw down chamber 168 can determine the pressure in the formation without being influenced by the pressure in the annulus 92 (such as drilling mud). The seal piston 166 and draw down chamber 168 are preferably separate from the centralizing pistons 72, 74 and 76 because the centralizing pistons 72, 74 and 76 may slip along the borehole wall 66 during centralizing. Such slipping might damage the seal piston 166 and prevent it from operating as required.

Once the seal piston 166 has extended, as shown in FIG. 11, the draw down chamber 168 is activated to withdraw fluids from the formation. In one embodiment, the withdrawn fluids are stored within the tool 32. After the fluid sample has been withdrawn from the formation and the formation fluid pressure has been measured, the seal piston 166 and draw down chamber 168 are then withdrawn back into the tool 32.

Figure 12:
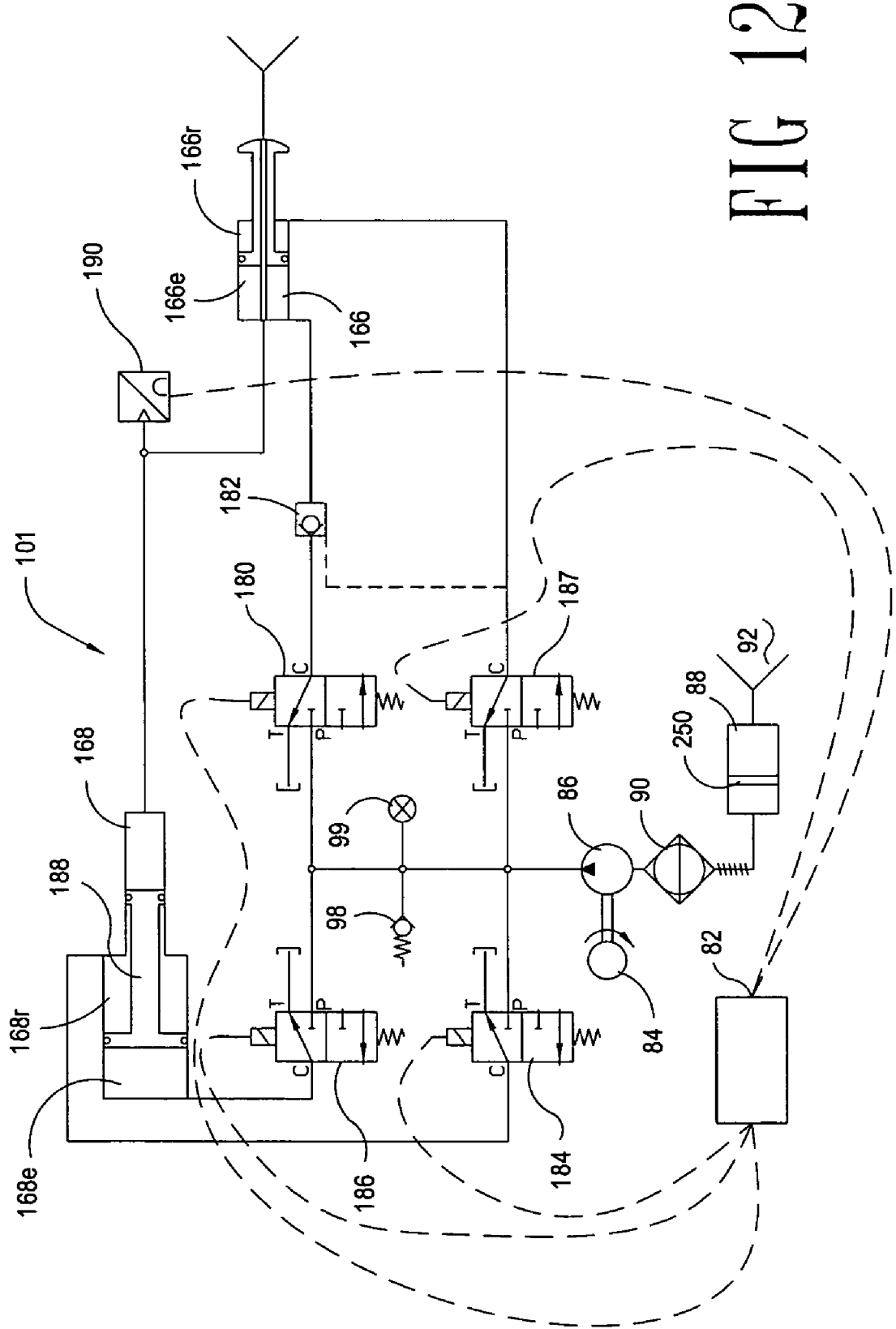
FIG. 12 is a schematic of a hydraulic circuit of the seal piston and drawdown piston of the formation tester of FIG. 3.

The hydraulic circuit 101 used to control the seal piston 166 and the draw down chamber 168 is illustrated in FIG. 12. The motor 84, pump 86, reservoir 88, filter 90, relief valve 98 and transducer 99 perform the same functions as the items bearing the same reference numbers in FIG. 9A. Preferably, the two hydraulic circuits 100, 101 are independent and employ separate motors, pumps, hydraulic reservoirs, filter, relief valve and pressure transducer. Alternatively, they may be combined to share the same such components.

The controller 82 actuates seal piston extend solenoid actuated valve 180 causing its control port (C) to be connected to its pump port (P) (block 146 in FIG. 9B). Hydraulic fluid flows through the seal piston extend solenoid actuated valve 180 and through check valve 182 to the extend side 166e of the seal piston 166 causing it to extend. When the seal piston 166 has extended to the point where it is sealed against the formation wall 66 (or it is fully extended) and it is no longer moving, the pressure within the hydraulic circuit 101 begins to increase. When the pressure reaches, for example, 3000 p.s.i., the relief valve 98 opens and releases hydraulic fluid from the hydraulic circuit into the reservoir 88. The check valve 182 prevents hydraulic fluid from draining from the seal piston 166 and keeps it sealed against the borehole wall. When the controller 82, through pressure transducer 99, detects the pressure in the hydraulic circuit stabilizing because of the opening of the relief valve 98 (block 148 in FIG. 9B), controller 82 activates the draw down chamber 168. The controller 82, which has been monitoring the pressure in the hydraulic circuit, does not deactivate the seal piston extend solenoid actuated valve 180 because if, for example, the tool 32 shifts so that the seal piston requires more hydraulic fluid to remain sealed against the borehole wall, the hydraulic fluid is available through seal piston extend solenoid actuated valve 180.

To activate the draw down chamber 168, the controller 82 activates a draw down chamber retract solenoid controlled valve 184, causing its control port (C) to be connected to its pump port (P) (block 150 in FIG. 9B). Hydraulic fluid flows through the draw down chamber retract solenoid controlled valve 184 and into the retract side 168r of the draw down chamber 168, causing the draw down chamber to retract. As a draw down chamber piston 188 within the draw down chamber 168 retracts, a pressure transducer 190 measures the pressure in the formation fluid. The pressure transducer 190 sends the pressure data to the controller 82 which sends it to the surface for analysis and/or records it. The controller 82 may also analyze the data collected and record the results and/or send the results to the surface.

The draw down chamber piston 188 stops moving when it has fully withdrawn and pressure within the hydraulic circuit 101 begins to increase. When the pressure reaches 3000 p.s.i., relief valve 98 opens and releases hydraulic fluid from the hydraulic circuit 101 into the reservoir 88. When the controller 82, which has been monitoring the pressure in the hydraulic circuit through transducer 99 (block 152 in FIG. 9B), detects a stabilization of the pressure in the hydraulic circuit 101, it deactivates the draw down chamber retract solenoid controlled valve 184 (block 154 in FIG. 9B).

At the same time, the controller 82 activates a draw down chamber extend solenoid controlled valve 186, causing its control port (C) to be connected to its pump port (P) (block 154 in FIG. 9B). Hydraulic fluid flows through the draw down chamber extend solenoid controlled valve 186 and into the extend side 168e of the draw down chamber 168, causing the piston 188 in the draw down chamber to extend. As the draw down chamber piston 188 within the draw down chamber 168 extends, it drives the formation fluid from the draw down chamber 168 through the central passageway of the seal piston 166 and into the annulus. Alternatively, the fluid may be driven into storage receptacles (not shown) for later analysis on the surface. The additional valves required to implement such a storage system are conventional and are not illustrated in FIG. 12.

The draw down chamber piston 188 stops moving when it has fully extended and pressure within the hydraulic circuit 101 begins to increase. When the pressure reaches, for example, 3000 p.s.i., relief valve 98 opens and releases hydraulic fluid from the hydraulic circuit 101 into the reservoir 88. When the controller 82, which has been monitoring pressure through transducer 99 (block 156 in FIG. 9B), detects a stabilization of pressure in the hydraulic circuit 101, it activates the seal piston retract solenoid controlled valve 187 and closes the seal piston extend solenoid controlled valve 180 (block 158 in FIG. 9B). Hydraulic fluid flows through the seal piston retract solenoid controlled valve 187 and into the retract side 166r of the seal piston 166. The seal piston 166 is prevented from moving by the presence of the check valve 182, which prevents hydraulic fluid from flowing out of the extend side 166e of the seal piston 166. When the pressure on the retract side 166r of the seal piston reaches a predetermined level, the pilot port of the check valve 182 causes it to open which allows the seal piston 166 to move. When the seal piston has fully retracted, the pressure in the hydraulic circuit 101 increases until the relief valve 98 actuates. The pressure in the hydraulic circuit 101 then stabilizes.

Referring again to FIG. 9A, the controller 82, which has been monitoring the pressure in the hydraulic circuit (block 159 in FIG. 9B), actuates the retract solenoid actuated valve 96, which causes its control port (C) to be connected to its pump port (P) (block 160 in FIG. 9B). At the same time, the controller deactivates the extend solenoid actuated valve 94 (block 160 in FIG. 9B). Hydraulic fluid flows through the retract solenoid actuated valve 96, through check valve 134 and to the retract side of the centralizer pistons 72, 74 and 76. At first, the centralizer pistons 72, 74 and 76 cannot move because the PCVs 108, 110 and 112 prevent hydraulic fluid from flowing out of the extend side of the centralizer pistons 72, 74 and 76. Consequently, the pressure on the retract side of the centralizer pistons 72, 74 and 76 increases. At a predetermined pressure, the pilot ports 114, 116 and 118 of the PCVs 108, 110 and 112, respectively, cause the PCVs to open and allow hydraulic fluid to flow out of the extend side of the centralizer pistons 72, 74 and 76, through the FCVs 102, 104 and 106, respectively, through the extend solenoid actuated valve 94 and into the hydraulic reservoir 88. Consequently, the centralizer pistons 72, 74 and 76 will begin to retract.

When the centralizer pistons 72, 74 and 76 have fully retracted, the pressure in the hydraulic circuit 100 will begin to increase, and when it reaches, for example, 3000 p.s.i., the relief valve 98 will open causing the pressure to stabilize. The controller 82, which has been monitoring pressure in the hydraulic circuit through the transducer 99 (block 162 in FIG. 9B), will detect that the pressure has stabilized and will turn the motor 84 off and return all valves to their original conditions (block 164 in FIG. 9B). The tool 32 is now back in its original condition.

The hydraulic circuit 100 illustrated in FIG. 9A also includes a fail-safe feature. The control port of a fail-safe solenoid actuated valve 136 is connected to the extend side of the centralizer pistons 72, 74 and 76. In its normal, unactuated position, the control port (C) is connected to its tank port (T). When it is time to extend the centralizer pistons 72, 74 and 76, the controller 82 actuates the fail-safe solenoid actuated valve 136, which causes its control port (C) to become connected to its pump port (P). The pump port (P) is capped off, which prevents fluid from flowing through the fail-safe solenoid actuated valve 136. Should power fail, however, the fail-safe solenoid actuated valve 136 will deactivate and revert to the position shown in FIG. 9A, which allows hydraulic fluid to flow from the centralizer pistons 72, 74 and 76 to the hydraulic reservoir 88 and allows the centralizer pistons 72, 74 and 76 to be pushed back into their retracted positions by forces outside the tool 32. Thus, if power to the tool 32 fails, the centralizer pistons 72, 74 and 76 will not be locked in their extended positions, where they would be susceptible to being damaged or destroyed if the drill string begins moving.

Figure 13:
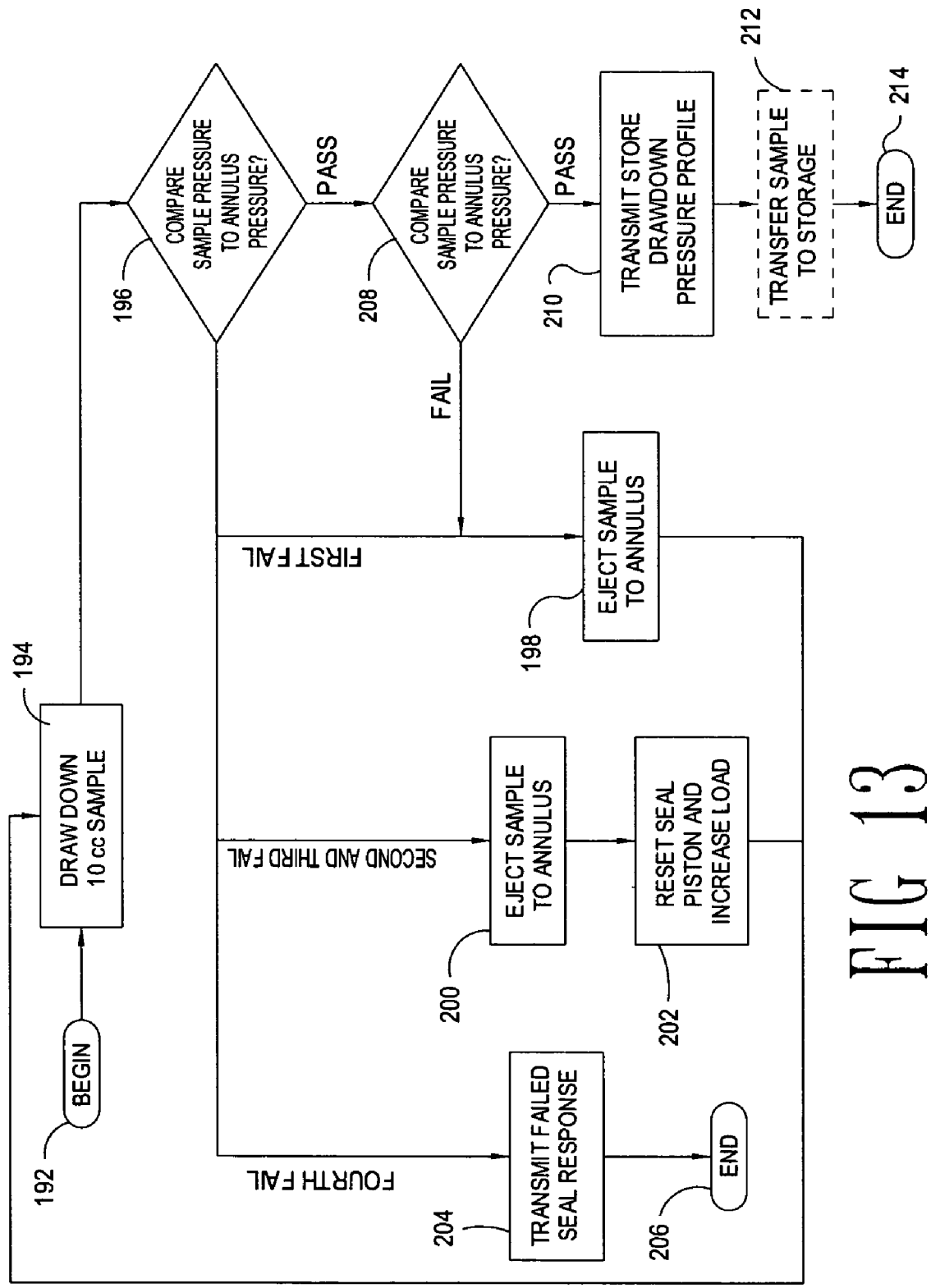
FIG. 13 is a flow chart showing the preferred sampling sequence for the formation tester of FIG. 3.

Operation of the MWD formation testing tool 32 after it is centralized in the borehole is illustrated in FIG. 13. The process begins (block 192) by drawing a 10 cc sample from the formation (block 194) via seal piston 166. It will be understood that the size of the sample can vary. The controller 82 stores a draw down pressure profile as the sample is being taken. The sample pressure is compared to the annulus pressure (block 196). If the sample pressure is the same as the annulus pressure, then the test is considered to have failed. After the first failure, the sample is ejected into the annulus (block 198) and the process begins again (block 194). On the second and third failures, the sample is ejected to the annulus (block 200) and the seal piston is reset with an increased load (block 202), in the hope that increased pressure on the seal piston will seal it against the borehole wall. If the test fails a fourth time, the tool 32 transmits a "failed seal response" message to the surface (block 204). The process then ends (block 206).

If any of the comparisons of sample pressure to annulus pressure pass, the resistance of the sample is checked (block 208). A resistance test is a conventional test performed on formation fluids. If the formation fluid is conductive, it may be water, salt water, drilling mud, formation fluid contaminated with drilling mud, or some other conductive fluid. If the formation is resistive, it may be a hydrocarbon.

Alternatively, any other fluid test can be performed such as an NMR, salinity test, or infrared analysis. Regardless of the particular test performed, if the sample fails the test based upon a predetermined test criteria, the fluid is ejected to the annulus 198 and the process is repeated (beginning at block 194). If the sample passes the resistance test (or other test that may be employed instead of or in addition to the resistance test), the controller 82 transmits the stored draw down pressure profile to the surface (block 210). The sample is then ejected into the annulus. Alternatively, the sample is transferred to storage (block 212) for analysis at a time after tool 32 has been retrieved to the surface. Alternatively, the tool 32 may incorporate equipment to analyze the sample and transmit the results to the surface. The process then ends (block 214).

The above discussion is meant to be illustrative of the principles and various embodiments of the present invention. While the preferred embodiment of the invention and its method of use have been shown and described, modifications thereof can be made by one skilled in the art without departing from the spirit and teachings of the invention. The embodiments described herein are exemplary only, and are not limiting. Many variations and modifications of the invention and apparatus and methods disclosed herein are possible and are within the scope of the invention. Accordingly, the scope of protection is not limited by the description set out above, but is only limited by the claims which follow, that scope including all equivalents of the subject matter of the claims.

What is claimed is:

1. A formation testing tool comprising:
   a longitudinal body having a flowbore and coupled to a MWD tool;
   a plurality of extendable centralizing pistons coupled to the body;
   an extendable sample device coupled to the body; and
   a centralizing hydraulic circuit to cause each of the plurality of centralizing pistons to extend at substantially the same rate.

2. The formation testing tool of claim 1 further comprising a plurality of extendable sample devices coupled to the body.

3. The formation testing tool of claim 1 wherein all of the extendable centralizing pistons are located at substantially the same cross-section of the longitudinal body.

4. The formation testing tool of claim 1 wherein at least one of the extendable centralizing pistons is located at a different cross-section of the longitudinal body than a second extendable centralizing piston.

5. The formation testing tool of claim 1 further comprising:
   a sample device hydraulic circuit to cause the sample device to extend; and
   a controller for controlling the centralizing hydraulic circuit and the sample device hydraulic circuit.

6. The formation testing tool of claim 5 further comprising a pressure transducer coupled with the controller, the centralizing hydraulic circuit, and the sample device hydraulic circuit.

7. The formation testing tool of claim 1 wherein the extendable centralizing pistons are received in cylinders in the longitudinal body, each cylinder having an extend side and a refract side of its corresponding cylinder, the formation testing tool further comprising:
   a source of hydraulic fluid;
   a plurality of flow control valves, each flow control valve to communicate hydraulic fluid from the source of hydraulic fluid to the extend side of a corresponding cylinder; and
   a first pressure-determining valve in parallel fluid communication with the retract side of the cylinders, the valve preventing the extendable centralizing pistons from moving until the pressure on the retract side of the cylinders reaches a predetermined pressure.

8. The formation testing tool of claim 7 wherein the first pressure-determining valve is a relief valve to actuate at the predetermined pressure, the actuation of the relief valve allowing hydraulic fluid to flow from the retract side of the cylinders.

9. The formation testing tool of claim 7 wherein the first pressure-determining valve comprises a solenoid activated valve.

10. The formation testing tool of claim 7 further comprising:
    a second pressure-determining valve coupled between the hydraulic fluid source and the flow control valves, the second pressure-determining valve to communicate hydraulic fluid from the hydraulic fluid source to add the pressure to extend the centralizing pistons.

11. The formation testing tool of claim 10 wherein the second pressure-determining valve comprises a solenoid activated valve.

12. The formation testing tool of claim 7 further comprising a pilot control valve coupled between a first flow control valve and the extend side of its corresponding cylinder, the pilot control valve to prevent the flow of hydraulic fluid out of the extend side of the cylinder unless the pressure on the retract side of the cylinder exceeds the predetermined pressure.

13. The formation testing tool of claim 7 further comprising a fail-safe valve coupled to the extend side of the cylinders, the fail-safe valve to remove the pressure to extend the centralizing pistons when power is removed from the fail-safe valve.

14. The formation testing tool of claim 13 wherein the fail-safe valve comprises a powered valve which in its unpowered condition communicates hydraulic fluid from the extend side of the cylinders to a hydraulic reservoir.

15. The formation testing tool of claim 14 wherein the powered valve comprises a solenoid activated valve.

16. The formation testing tool of claim 7 wherein each flow control valve has an inlet side and an outlet side and allows fluid to flow from the inlet side to the outlet side when the pressure on the outlet side is between a lower limit pressure and an upper limit pressure.

17. The formation testing tool of claim 1 wherein the extendable sample device is received in a sample device cylinder in the body, the sample device cylinder having an extend side and a retract side, the formation testing tool further comprising:
a source of hydraulic fluid;
a sample device extend valve, the sample device extend valve to communicate hydraulic fluid from the source of hydraulic fluid to the extend side of the sample device cylinder; and
a draw down chamber communicating with the hydraulic fluid source, the draw down chamber to actuate when the extend side of the sample device cylinder reaches a predetermined pressure.

18. The formation testing tool of claim 17 wherein the draw down chamber is received in a draw down cylinder in the body, the draw down chamber cylinder having an extend side and a retract side, the formation testing tool further comprising:
a sample device retract valve, the sample device retract valve to communicate hydraulic fluid from the source of hydraulic fluid to the retract side of the sample device cylinder;
a draw down chamber extend valve, the draw down chamber extend valve to communicate hydraulic fluid from the source of hydraulic fluid to the extend side of the draw down cylinder;
a draw down chamber retract valve, the draw down chamber retract valve to communicate hydraulic fluid from the source of hydraulic fluid to the retract side of the draw down cylinder;
a hydraulic fluid pressure transducer; and
a formation fluid pressure transducer coupled between the draw down chamber and the extendable sample device.

19. The formation testing tool of claim 1 further comprising:
a controller coupled to the centralizing hydraulic circuit; and
wherein the centralizing hydraulic circuit includes:
a plurality of flow control valves each separately communicating with an extend side of a corresponding extend able centralizing piston; and
a first relief valve communicating in parallel with a retract side of each extendable centralizing piston.

20. A method for formation testing comprising:
communicating hydraulic fluid between a centralizing hydraulic circuit and a plurality of centering pistons;
extending at substantially the same rate the plurality of centering pistons from a formation testing tool;
centering the formation testing tool in a borehole;
testing the formation during a drilling operation; and
communicating a formation test result to a MWD tool.

21. The method of claim 20 wherein communicating hydraulic fluid between a centralizing hydraulic circuit and a plurality of centering pistons further comprises:
communicating hydraulic fluid through a plurality of flow control valves to a corresponding extend side of each of the centering pistons; and
receiving hydraulic fluid into a relief valve communicating in parallel with a retract side of each of the centering pistons.

22. The method of claim 20 wherein the testing the formation comprises extending a testing piston, separate from the plurality of centering pistons.

23. The method of claim 22 wherein extending a testing piston comprises:
opening a testing piston extend valve;
communicating from a hydraulic fluid source hydraulic fluid to the testing piston;
exerting a hydraulic fluid pressure on the testing piston; and
stabilizing the fluid pressure.

24. The method of claim 23 wherein testing further comprises:
opening a draw down chamber retract valve;
communicating hydraulic fluid from the hydraulic source to the draw down chamber;
exerting a hydraulic fluid pressure on the draw down chamber;
communicating a formation fluid sample from the testing piston to the draw down chamber; and
comparing the formation fluid sample pressure to an annulus fluid pressure.

25. The method of claim 24 wherein testing further includes ejecting the formation fluid sample from the drawdown chamber and from the testing piston if the formation fluid sample pressure and the annulus fluid pressure are substantially the same.

26. The method of claim 24 wherein testing further includes performing a fluid test on the formation fluid sample.

27. The method of claim 20 wherein extending a plurality of centering pistons comprises:
receiving a command from a controller;
starting a motor in response to receiving the command;
opening a centering piston extend valve; and
communicating from a hydraulic fluid source hydraulic fluid to each of the plurality of centering pistons to cause each of the centering pistons to extend at substantially the same rate.

* * * * *